United States Patent Office 3,703,506
Patented Nov. 21, 1972

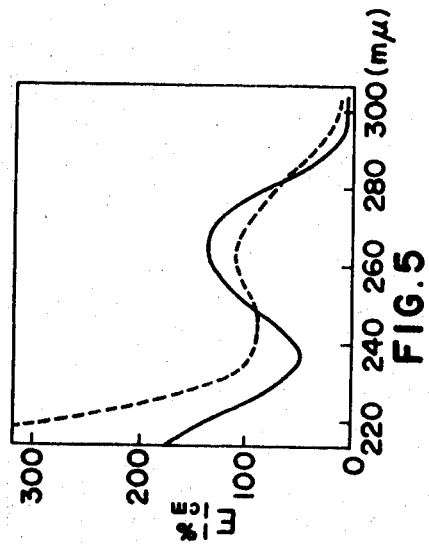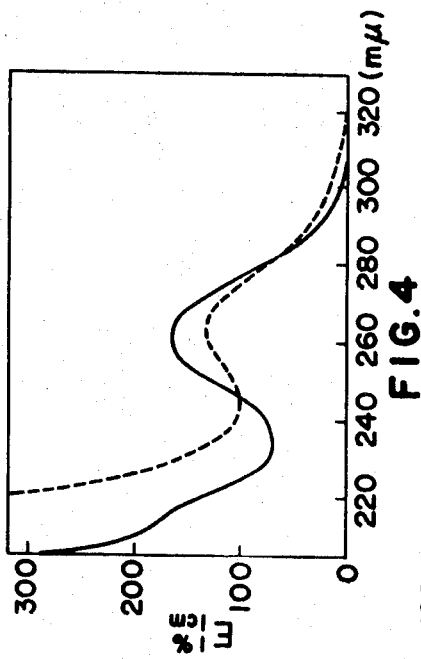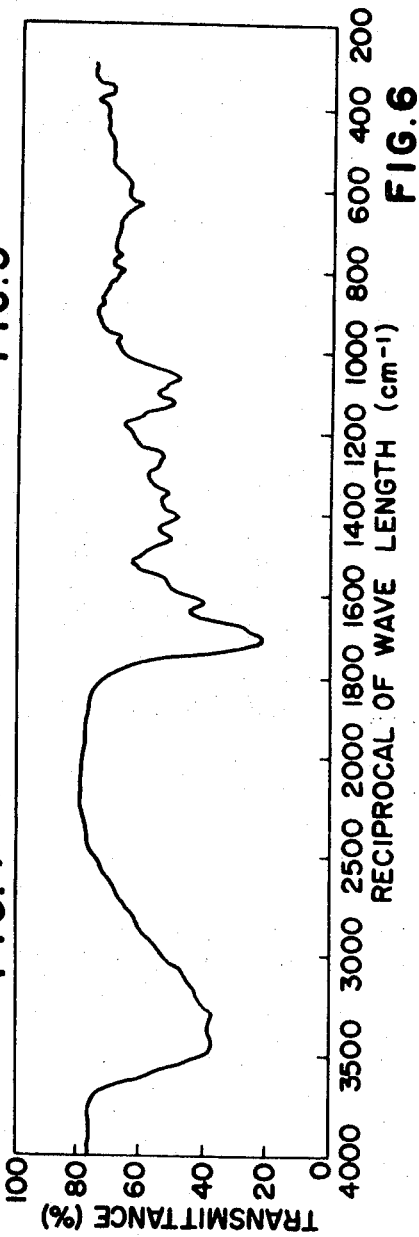

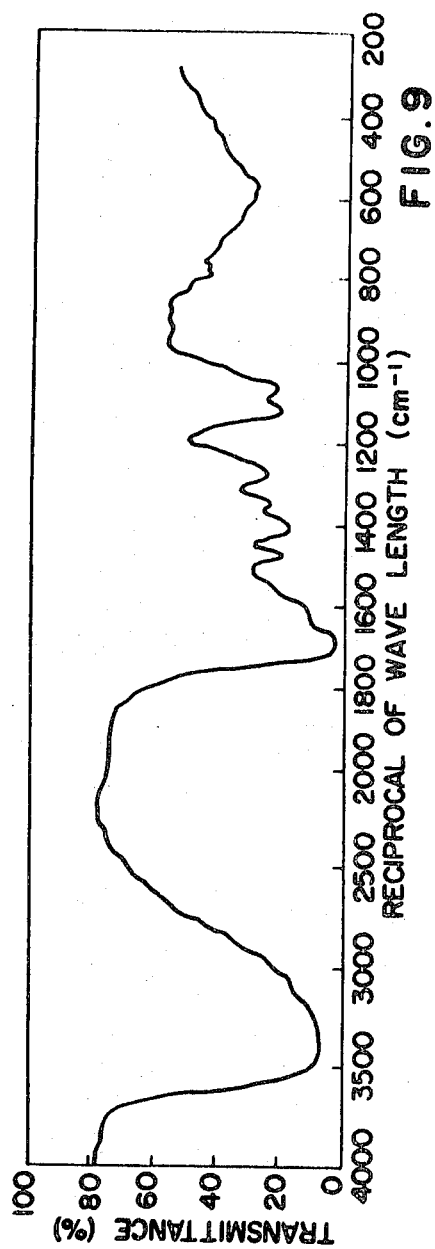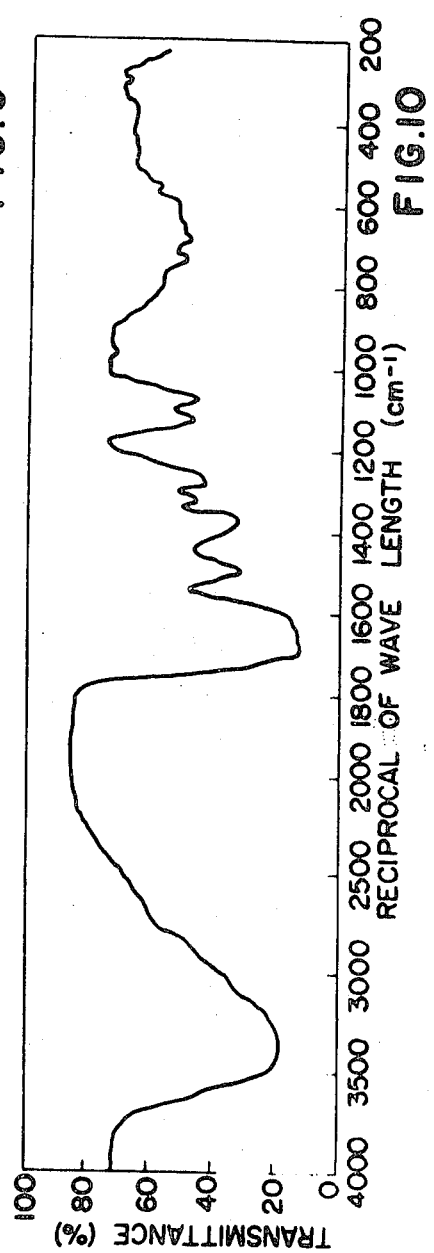

3,703,506
ANTIBIOTICS OF AGRICULTURAL FUNGICIDES, POLYOXINS D, E, F, G AND H
Saburo Suzuki, 4–17 Hagiyama Murayama-shi; Kiyoshi Isono, N7–14, 2–17 Kirigaoka, Kita-ku; and Junsaku Nagatsu, 62–28 Kunitachi, Higashi-ku, all of Tokyo, Japan
Continuation-in-part of application Ser. No. 643,275, June 2, 1967. This application Sept. 3, 1968, Ser. No. 757,010
Claims priority, application Japan, June 6, 1966, 41/36,439; July 19, 1966, 41/47,193
Int. Cl. C07d 51/52
U.S. Cl. 260—211.5 R                    5 Claims

ABSTRACT OF THE DISCLOSURE

Polyoxins D, E, F, G and H are each a novel antibiotic to be used as an agricultural fungicide for the protection of plants.

Said polyoxins are prepared by collecting polyoxin complex containing said polyoxins from a culture medium in which has been cultivated a strain of Streptomyces cacaoi var. asoensis that is on deposit with the American Type Culture Collection (ATCC) as ATCC access numbers 19093 and 19094, and then separating said complex into each of said polyoxins.

CROSS-REFERENCE TO RELATED APPLICATIONS

This is continuation-in-part application of the application Ser. No. 643,275 filed on June 2, 1967 now abandoned, and is related to application Ser. No. 490,001, filed on Sept. 24, 1965, now abandoned and its continuation-in-part application, which describe polyoxins A and B, and to application of Suzuki et al. describing polyoxins J, K and L which is Ser. No. 739,751, filed on June 25, 1968, now abandoned.

BACKGROUND OF THE INVENTION

The present invention relates to polyoxins D, E, F, G, and H which are novel antibiotics and to a process for preparing the same. Polyoxins A and B are described in Agr. Biol. Chem., vol. 29, No. 9, pages 848–854, 1965, and polyoxins D, E, F, G and H are described in Agr. Biol. Chem., vol. 30, No. 8, pages 813–814, 1966 and vol. 31, No. 2, pages 190–197, 1967. More particularly, it relates to novel antibiotics which have been named "polyoxin D," "polyoxin E," "polyoxin F," "polyoxin G" and "polyoxin H" each deriving from the numerous (poly) number of oxygen (oxin) within the molecules. These antibiotics have specific antifungal activity against various kinds of phytopathogenic fungi and are to be used as agricultural fungicides for the protection of plants They are prepared by collecting polyoxin complex containing polyoxins D, E, F, G and H from a culture obtained by cultivating in a culture medium a novel strain of Streptomyces cacaoi var. asoensis Nos. 20–52, 20–60 (type I) or No. 20–66 (type II) that is a mutant of Streptomyces cacaoi belonging to Streptomyces griseus group. This strain is on deposit with ATCC in an unrestricted deposit as ATCC access numbers 19093 and 19094, respectively, and then separating the collected complex into each of polyoxins D, E, F, G and H by distribution chromatography using a solvent system to elute polyoxins D, E, F, G and H, or by repeated recrystallization from an aqueous solvent according to fractional crystallization technique. The invention also relates to a process for the preparation thereof.

The novel strains, Nos. 20–52, 20–60 and No. 20–66 which are employed in the process of the invention were isolated from the solid collected in the Bochu Aso district of Kumamoto Prefecture, Japan.

The two strains, Nos. 20–52 and 20–60 have been designated herein as "type I" and the strain, No. 20–66 has been designated herein as "type II." Further, the novel strains of type I and type II employed herein been named "Streptomyces cacaoi var. asoensis." The strains identified as Streptomyces cacaoi var. asoeinsis, type I and II have been assigned the American Type Culture Collection (ATCC) as ATCC access numbers 19093 and 19094, respectively, and are on deposit with ATCC in an unrestricted deposit permitting the public full access to the cultures. The strains were released for distribution to the public on Mar. 27, 1968.

The strains of Streptomyces cacaoi var. asoensis, type I and type II are substantially identical to each other in morphological characteristics and in the property of utilization of carbon source. However, the strain of Streptomyces cacaoi var. asoensis, type II is different in color tone on the reverse of Czapek's agar and shows small differences on other agar preparations as compared with the strain of Streptomyces cacaoi var. asensis, type I.

The strain of Streptomyces cacaoi var. asoensis is similar to the three species Streptomyces griseus, Streptomyces griseolus and Streptomyces cacaoi among the known strains described in Bergey's Manual of Determination Bacteriology, 7th edition, or in the Actinomycetes, 2nd vol., authored by Waksman. In view of the detailed properties of Streptomyces cacaoi var. asoensis, it is considered that it belongs to Streptomyces griseus group.

When Streptomyces cacaoi var. asoensis, type I showing the typical properties of Streptomyces cacaoi var. asoensis is compared with these species, differences of pigment producibility on Czapek's agar and calcium malate agar as to Streptomyces griseolus; differences of color tone of serial mycelia on various agar preparation as to Streptomyces griseus; and also the difference that said two species do not form spirals, are noticed which clearly distinguished Streptomyces cacaoi var. asoensis from said two strains. The morphological and cultural characteristics of Streptomyces cacaoi var. asoensis are most clearly similar to those of Streptomyces cacaoi, although for Streptomyces cacaoi the serial mycelia are always white on nutrient agar, yellow pigment is formed on starch agar and no soluble pigment is formed on potato plug and gelatin. Therefore, Streptomyces cacaoi var. asoensis appears to belong to the species Streptomyces cacaoi, but based on these differences and the characteristic ability of Streptomyces cacaoi var. asoensis to produce novel antibiotics, polyoxins A and B, it is reasonable to consider it to be a mutant of Streptomyces cacaoi. Streptomyces cacaoi var. asoensis, type II is naturally also included.

The microbial characteristics of novel strains of Streptomyces cacaoi var. asoensis, type I and II which are capable of producing novel antibiotics, polyoxins D, E, F, G and H are as follows:

(1) Microscopic observation

Growth was observed to be good at from 20 to 32° C. Aerial mycelia are monopodially branched on synthetic agar and protein-containing agar media. Sporophores form open spirals and no whirls. The shape and size of spores are asymmetrically rod-like ($1.5–1.8\mu \times 0.5–0.7\mu$), or oval ($1.2–1.0\mu \times 1.0–0.7\mu$), and the spore surfaces are smooth.

(2) Cultural characteristics of Streptomyces cacaoi var. asoensis (1) Czapek's agar (27° C.):

Type I—grows well in colorless or white buff, and forms abundant aerial mycelia which are powdery and changes from white to smoke-grey. The reverse is pale olive-yellow without soluble pigment.

Type II—forms aerial mycelia which are powdery and changes from white to tilleul-buff. The reverse is yellow-tinged with pale pink.

(2) Glycerine Czapek's agar (27° C.):

Type I—grows well, pale olive-buff, None or scant, thin white aerial mycelia are formed. The reverse is pale olive-buff or creamy without soluble pigment.
Type II—no aerial mycelia formed, otherwise same as type I.

(3) Nutrient agar (27° C.):

Type I—grows well, wrinkled, smoke-grey, and scant aerial mycelia are formed which change from white to pale grey. The reverse has a slight brown yellow color and produces brown soluble pigment.
Type II—grows same as type I and forms very scant aerial mycelia which are white to whitish grey. Soluble pigment obtained is less than for type I.

(4) Glucose peptone agar (27° C.):

Type I—grows from creamy to pale greyish-olive. None or scant, whitish grey aerial mycelia are formed. The reverse is pale brown and forms light brown soluble pigment.
Type II—grows scant with slight formation of white or pale grey aerial mycelia in the latter period of culture. The reverse is olive-buff.

(5) Glucose asparagine agar (27° C.):

Type I— grows wrinkled and changes from white to cartridge-buff, forming aerial mycelia from white to pale grey or grey in color. The reverse is cartridge-buff and yields no soluble pigment.
Type II—shows very little growth of aerial mycelia, some formation of white grey aerial mycelia occurs.

(6) Starch agar (27° C.):

Type I—grows well, colorless or olive-buff and forms abundant powdery, pale mouse-grey aerial mycelia. The reverse is olive-yellow and yields no soluble pigment. Hydrolyzing activity of starch is normal.
Type II—same as type I.

(7) Calcium malate agar (27° C.):

Type I—grows colorless or pale brown and yellow and forms abundant mouse-grey aerial mycelia. The reverse is creamy yellow and give some formation of light yellow-brown soluble pigment.
Type II—same as type I.

(8) Tyrosine agar (27° C.):

Type I—grows poor, brown color, forms no aerial mycelia. The reverse is creamy color and produces no soluble pigment.
Type II—same as type I.

(9) Egg albumin agar (27° C.):

Type I—grows well, colorless to white and forms substantially no aerial mycelia, but sometimes forms very small white aerial mycelia in the latter period of culture. The reverse is white but yields no soluble pigment.
Type II—same as type I.

(10) Oat meal agar culture medium (27° C.):

Type I—grows olive-buff and forms some pale grey aerial mycelia. Sometimes formation of aerial mycelia does not occur. The reverse is colorless and yields no soluble pigment.
Type II—same as type I.

(11) Potato plug (27° C.):

Type I—grows well, dark-olive and forms pale grey aerial mycelia. The medium changes color to pale smoke-grey.

Type II—same as type I.

(12) Gelatin stab (18° C.):

Type I—grows well and gelatin liquefaction is slight. Dark brown soluble pigment is produced to a small extent.
Type II—gives scarcely any gelatin liquefaction.

(13) Glucose broth (27° C.):

Type I—grows well on and under the surface of the solution and produces soluble brown pigment.
Type II—same as type I.

(14) Czapek's solution (27° C.):

Type I grows well on the surface and at the bottom of the solution and forms thin membranes on the surface together with a little white aerial mycelia. Soluble pigment is not obtained.
Type II—produces no membrane on the surface.

(15) Melanin formation:

Both types I and II are negative.

(16) Nitrate reduction:

Both types I and II are slightly positive.

(17) Cellulose culture medium:

There is no growth on synthetic culture solution containing cellulose as the sole carbon source.

(18) Nutrient (meat, peptone and glucose) agar medium:

Type I—grows good, light olive-buff and wrinkled, and it forms very scant white aerial mycelia or sometimes forms none of them. The reverse of the culture is white in color and type I produces black soluble pigment in a very small amount.
Type II—grows good, creamy-yellow, without formation of aerial mycelia. The reverse is smooth. Type II is similar to type I in other respects than described above.

(19) Löffler's serum medium (27° C.):

Type I—grows good, olive-yellow and deep wrinkled, and forms no mycelia. It forms black soluble pigment in a small amount.
Type II—same as type I.

(20) Litmus milk (27° C.):

Type I—grows forming brown circle on the surface and does not cause coagulation and peptonization. The pH value is 4.0–5.0 on the 20th day after the start of culture.
Type II—grows in whirls on the surface, and causes gradual coagulation with slight peptonization. The pH value is 7.8–8.0 on the 20th day after the start of culture.

(3) Physiological properties (1) Optimum conditions for growth:

pH—6–8 (type I, type II)
Temperature—25–30° C. (type I, type II)
Very aerobic—(type I, type II)

(2) Critical conditions for possible growth:

pH's—9 and 4 (type I), 10 and 4 (type II)
Temperature—18° C. and 37° C. (type I, type II)

(3) Tyrosinase:

The reaction is weakly positive (type I, type II).

(4) Peptonization of milk:

Type I, negative
Type II, positive (5) Decomposition of cellulose:

Both type I and type II, negative.

(6) Chromogenic function:

Weakly positive and occasionally negative (4) Utilization of carbon sources

The utilization of carbon sources determined according to T. G. Pridham is as follows:

| Type | I | II |
|---|---|---|
| Glucose | + + + | + + + |
| Sucrose | + + + | + + + |
| Starch | + + + | + + + |
| Lactose | + + | + + + |
| Fructose | + | + + |
| Maltose | + + + | + + + |
| Inulin | + + + | + + + |
| Inositol | + + | + + |
| Raffinose | + + + | + + + |
| Arabinose | + | + |
| Galactose | + | + + |
| Xylose | + | + |
| Mannose | + + | + + |
| Rhamnose | + + + | + + + |
| Mannitol | + + + | + + + |
| Salicin | + | + |

NOTE.—+ + += Good growth; + += Medium growth; += Scant growth.

According to the process of the present invention, the polyoxin complex containing the antibiotics, polyoxins A and B can be produced using not only *Streptomyces cacaoi* var. *asoensis* described above, but also polyoxin producing natural and artificial mutants thereof.

In the practice of the present invention, the fermentation may be carried out according to the usual fermentation method for common Streptomyces. Generally speaking, starch, dextrin, glucose, glycerine, maltose, fructose and the like are used for carbon sources. Meat extracts, peptone, corn-sttep liquor, soybean powder, peanut powder, cotton-seed powder, yeast and the like are used for nitrogen sources. Inorganic materials, for example, sodium chloride, potassium chloride, calcium carbonate, and potassium phosphate and the like may be added to the almost neutral liquid culture medium. The medium is inoculated with the strain of *Streptomyces cacaoi* var. *asoensis* and cultivation is carried out under stirring at a temperature of from 25 to 35° C. In general the concentration of antibiotics produced reaches a maximum after from 40 to 100 hours, e.g. 40 to 60 hours, of cultivation. Since the time of maximum concentration may vary according to the aeration and stirring conditions, even when using the same temperature and the culture medium of the same components, it is advisable to decide the time, by determining the potency in each case.

Commonly used physicochemical methods can be employed in order to isolate the antibiotics from the culture broth. For example, at first, the mycelia may be first removed by filtration with the addition of a filter-aid, such as an acid or neutral diatomaceous earth, and the filtrate then adsorbed on activated carbon at acidic or neutral pH. The antibiotics can be eluted from the activated carbon by a solvent for the antibiotics, i.e. a mixture of water and watermiscible solvents, for example methanol, ethanol, propanol, butanol, acetone, acetic acid and pyridine. Since polyoxins are amphoteric compounds, they are adsorbed on either cation or anion exchange resins and are eluted by suitable acid, alkali or salt solutions. For example, the culture filtrate, after being made acidic, may be passed through a column containing Dowex 50-WX8 (H-type) (the word "Dowex" is a trademark), and the polyoxins that are adsorbed thereon are eluted therefrom by an aqueous solution of 5% sodium chloride or phosphate buffer of pH 4.3. The crude powder of polyoxin complex which is thus obtained can be purified by column-chromatographies using an ion-exchanger, such as sulfoethyl sephadex (the word "Sephadex" is a trademark), sulfoethylcellulose or sulfomethylcellulose, or by a zone electrophoresis technique.

The polyoxin complex thus purified is treated with a basic resin to separate it into polyoxins D, E and F which are adsorbed on the resin, and polyoxins A, B, G and H which are not. The adsorbed polyoxins D, E and F are eluted by a solution of inorganic salt, acid, alkali or the like.

By zone electrophoresis using a buffer solution having a pH value higher than 3, the polyoxin complex can also be separated into polyoxins D, E and F which move a longer distance to the anode, and polyoxins A, B, G and H which move a shorter distance thereto.

Complete separation of a mixture of polyoxins A, B, G and H into these individual component polyoxins is carried out by partition-chromatography using cellulose powder or silica gel, and this separation procedure is of course applicable to the case where the mixture is a mixture of polyoxins D, E and F. Each of the component polyoxins is sepuarately eluted after developing with a suitable solvent i.e. a mixture of water and water miscible solvents, for example methanol, ethanol, propanol, butanol, acetone, acetic acid and pyridine.

The complete separation is effectively carried out by said chromatography in combination with a fractional crystallization process in which recrystallization from an aqueous solvent is repeated.

By recrystallization from an aqueous alcohol, each of polyoxins D, E, F, G and H is obtained as a crystalline powder.

The physico-chemical properties of polyoxins D, E, F, G and H are as follows:

(1) Decomposition points

Though polyoxins D, E, F, G and H (hereinafter referred to as D, E, F, G and H) show no definite decomposition point, it is evident that they begin to get colored and decompose at temperatures above 190° C., 180° C., 190° C., 190° C. and 200° C., respectively.

(2) Analytical data of elementary composition

Each of D, E, F, G and H contains carbon, hydrogen, nitrogen and oxygen (percent) by weight, the balance being oxygen:

D: C, 39.44; H, 4.45; N, 13.62
E: C, 40.52; H, 4.88; N, 14.02
F: C, 43.87; H, 4.96; N, 12.76
G: C, 41.61; H, 5.17; N, 14.16
H: C, 46.13; H, 5.49; N, 13.64

(3) Molecular weights

The molecular weight of each of D, E, F, G and H was determined by electric titration method because they are amphoteric compounds.

D: 530
E: 521
F: 616
G: 497
H: 645

(4) Molecular formulae

D: $C_{17}H_{23}N_5O_{14}$
E: $C_{17}H_{23}N_5O_{13}$
F: $C_{23}H_{30}N_6O_{15}$
G: $C_{17}H_{25}N_5O_{12}$
H: $C_{23}H_{32}N_6O_{13}$ (5) Contents of the elements and molecular weights calculated from the molecular formulae D: Calcd. for $C_{17}H_{23}N_5O_{14}$. Mol. wt. 521.39. Contents: C, 39.16; H, 4.45; N, 13.43.

E: Calcd. for $C_{17}H_{23}N_5O_{13}$. Mol. wt. 505.39. Contents: C, 40.40; H, 4.59; N, 13.86.

F: Calcd. for $C_{23}H_{30}N_6O_{15}$. Mol. wt. 630.52. Contents: C, 43.81; H, 4.80; N, 13.33.

G: Calcd. for $C_{17}H_{25}N_5O_{12}$. Mol. wt. 491.41. Contents: C, 41.55; H, 5.13; N, 14.25.

H: Calcd. for $C_{23}H_{32}N_6O_{13}$. Mol. wt. 600.53. Contents: C, 46.00; H, 5.37; N, 14.00.

(6) Chemical structures

D, E, F, G and H have the following chemical structures:

D:

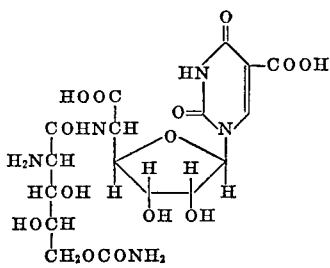

E:

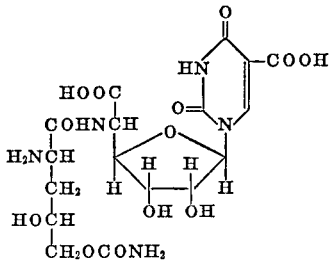

F:

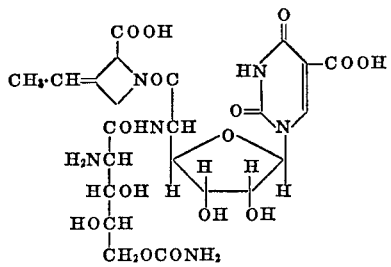

G:

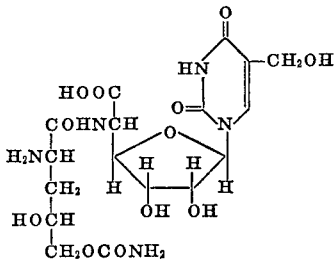

H:

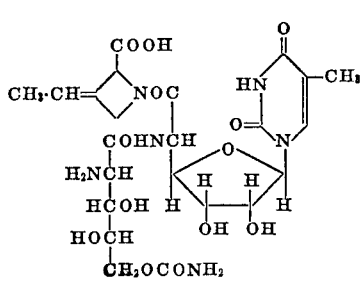

As shown in the above structures, it is noted that D, E, F, G and H have the close similarity on their chemical structures.

(7) Specific optical rotations

D: $[\alpha]_D^{20}+30°$ (C=1, water)
E: $[\alpha]_D^{20}+19°$ (C=1, water)
F: $[\alpha]_D^{20}-18°$ (C=1, water)
G: $[\alpha]_D^{20}+37°$ (C=1, water)
H: $[\alpha]_D^{20}-38°$ (C=1.3, water)

(8) Ultraviolet absorption spectra

The spectra for D, E, F, G and H are shown in FIGS. 1, 2, 3, 4 and 5, respectively.

The absorption maxima are as follows:

D: $\lambda_{max.}^{0.05\,N\,HCl}=218$ m$\mu$ ($E_{1\,cm.}^{1\%}$ 217)

$276$ m$\mu$ ($E_{1\,cm.}^{1\%}$ 217)

$\lambda_{max.}^{0.05\,N\,NaOH}=271$ m$\mu$ ($E_{1\,cm.}^{1\%}$ 137)

E: $\lambda_{max.}^{0.05\,N\,HCl}=218$ m$\mu$ ($E_{1\,cm.}^{1\%}$ 200)

$276$ m$\mu$ ($E_{1\,cm.}^{1\%}$ 200)

$\lambda_{max.}^{0.05\,N\,NaOH}=271$ m$\mu$ ($E_{1\,cm.}^{1\%}$ 128)

F: $\lambda_{max.}^{0.05\,N\,HCl}=215$ m$\mu$ ($E_{1\,cm.}^{1\%}$ 257)

$276$ m$\mu$ ($E_{1\,cm.}^{1\%}$ 181)

$\lambda_{max.}^{0.05\,N\,NaOH}=271$ m$\mu$ $E_{1\,cm.}^{1\%}$ 118)

G: $\lambda_{max.}^{0.05\,N\,HCl}=261$ m$\mu$ ($E_{1\,cm.}^{1\%}$ 170)

$\lambda_{max.}^{0.05\,N\,NaOH}=264$ m$\mu$ ($E_{1\,cm.}^{1\%}$ 134)

H: $\lambda_{max.}^{0.05\,N\,HCl}=265$ m$\mu$ ($E_{1\,cm.}^{1\%}$ 127)

$\lambda_{max.}^{0.05\,N\,NaOH}=266$ m$\mu$ ($E_{1\,cm.}^{1\%}$ 103)

Degradative study has clearly shown that these absorptions for G are attributed to the presence of a chromophore, 5-hydroxymethyluracil, in the molecule of G, and A and B contain the same chromophore as above, and that the ultraviolet absorptions for D, E and F are attributed to the presence of a chromophore, uracil 5-carboxylic acid, in the molecule of D, E and F, while the ultraviolet absorption for H a chromophore, thymine.

(9) Infrared absorption spectra

The infrared absorption spectra for D, E, F, G and H in the form of potassium bromide tablets are shown in FIGS. 6, 7, 8, 9 and 10, respectively.

Main absorption occurred at the following wave lengths expressed in frequency:

D: 3200–3500, 1716, 1620, 1565, 1463, 1410, 1350, 1257, 1130, 1070, 970, 885, 806, 770 cm.$^{-1}$
E: 3200–3500, 1690, 1617, 1470, 1410, 1385, 1345, 1275, 1120, 1065, 880, 823, 769 cm.$^{-1}$
F: 3200–3500, 1710, 1635, 1465, 1380, 1275, 1125, 1665, 810 cm.$^{-1}$
G: 3200–3500, 1685, 1605, 1476, 1415, 1346, 1282, 1125, 1065, 790, 770 cm.$^{-1}$
H: 3400, 1693, 1640, 1470, 1380, 1320, 1280, 1130, 1060, 900, 595 cm.$^{-1}$

(10) $R_f$ values $R_f$ values determined by developing with butanolacetic acid-water (4:1:2 by volume), using Toyo filter paper No. 51 are as follows:

D=0.10
E=0.13
F=0.21g
G=0.12
H=0.27

$R_f$ values for A and B determined under the same conditions as above, are as follows: A=0.61, B=0.10.

$R_f$ values determined by developing with a 75% phenol are as follows:

D=0.08
E=0.12
F=0.38   } $R_f$ values for A and B determined under the same
G=0.30      conditions are as follows: A=0.53, B=0.18.
H=0.66

(11) Solubilities

D, E, F, G and H are easily soluble in water, but hardly soluble in methanol, ethanol, acetone, chloroform, benzene, ether and the like.

(12) Color reactions

D, E, F, G and H are positive to ninhydrin, metaperiodate-benzidine and diazo reaction, but are negative to Fehling, 2,4-dinitrophenylhydrazine, Molish, ferric chloride, sodium nitroprusside, Sakaguchi and the like reaction.

(13) Pk's values

D, E, F, G and H are amphoteric compounds, and the first three have four titratable groups and the last two the three groups, respectively.

Pk's values thereof are as follows:

D: 2.6  3.7  7.3  9.4
E: 2.8  3.9  7.4  9.3
F: 2.7  3.9  7.2  9.3
G: 3.2  7.3  9.3
H: 3.2  7.2  9.4

(14) Stabilities

D, E, F, G and H are unstable in an alkaline solution, but are very stable in an acidic or neutral solution with hardly any decomposition when heated in this solution at a pH value of 2–7 and a temperature of 100° C. for 15 minutes. And they are also stable to ultraviolet ray irradiation, and they will not lose their antibacterial activities even after they have been irradiated in aqueous solution by a 20 watt chemical lamp situated 30 centimeters above the surface of the solution for 24 hours.

Summing up, comparison of the physico-chemical properties of polyoxins D, E, F, G and H with those of the known antibiotics indicates clearly that the former are novel antibiotics which are different from each of the latter.

The biological activities of polyoxins D, E, F, G and H will be hereunder described.

(1) Antimicrobial spectra

The following table shows the antimicrobial spectrum of polyoxins D, E, F, G and H in minimal inhibitory concentration for phytopathogens. The minimal inhibitory concentration was determined 48 hours after incubation using a potato sucrose agar medium and test organisms listed in the following table.

As shown in the table, both polyoxins D, E, F, G and H are characterized in that they have very specific high activities against various phytopathogens, for example *Alternaria kikuchiana, Cochliobolus miyabeanas, Pellicularia sasakii* and *Piricularia oryzae*, but are hardly active against other fungi, such as Trichlophyton, Candid, Cryptococcus, Aspergillus and Mucor, and also inactive against all kinds of bacteria tested.

TABLE.—ANTIMICROBIAL SPECTRUM OF POLYOXINS D, E, F, G AND H

| Test organism | Minimal inhibitory concentration (mcg./ml.) | | | | |
|---|---|---|---|---|---|
| | D | E | F | G | H |
| *Piricularia oryzae* | 3.12 | 12.5 | 25 | 6.25 | 3.1 |
| *Cochliobolus miyabeanus* | 6.25 | 12.5 | 6.25 | 3.12 | 25–50 |
| *Pellicularia sasakii* | <1.56 | 3.12 | 50 | 3.12 | 50 |
| *Alternaria kikuchiana* | 50 | 50 | 100 | 6.25 | 25–50 |
| *Physalospora laricina* | 100 | 50 | >100 | 6.25 | 3.1–6.2 |
| *Cladosporium fulvum* | 100 | 25 | 25 | 3.12 | 12.5–25 |
| *Phytophthora parasitica* | — | >100 | >100 | >100 | 100 |
| *Helminthosporium sigmoideum* | — | — | 25 | 25 | 25–50 |
| *Sclerotinia sclerotiorum* | <100 | <100 | <100 | <100 | 6.2 |
| *Corticium rolfsii* | 1.56 | — | 1.56 | 1.56 | — |
| *Guignardia laricina* | 3.12 | — | 6.25 | 1.56 | — |
| *Diaporthe citri* | 100 | — | 100 | 6.25 | — |
| *Trichophyton interdigitalis* | >50 | >50 | >50 | >50 | >50 |
| *Trichophyton rubrum* | >50 | >50 | >50 | >50 | >50 |
| *Candida albicans* | >50 | >50 | >50 | >50 | >50 |
| *Candida tropicalis* | >50 | >50 | >50 | >50 | >50 |
| *Candida crusei* | >50 | >50 | >50 | >50 | >50 |
| *Cryptococcus neojormans* | >50 | >50 | >50 | >50 | >50 |
| *Aspergillus germigatus* | >50 | >50 | >50 | >50 | >50 |
| *Aspergiolus terreus* | >50 | >50 | >50 | >50 | >50 |
| *Mucor racemosus* | >50 | >50 | >50 | >50 | >50 |
| *Nocardis asteroides* | >50 | >50 | >50 | >50 | >50 |
| *Trichomonas vaginalis* | >50 | >50 | >50 | >50 | >50 |
| *Staphylococcus auereus* 209p | >50 | >50 | >50 | >50 | >50 |
| *Micrococcus luteus* | >50 | >50 | >50 | >50 | >50 |
| *Bacillus subtilis* | >50 | >50 | >50 | >50 | >50 |
| *Mycobacterium smegmatis* | >50 | >50 | >50 | >50 | >50 |
| *Mycobacterium* 607 | >50 | >50 | >50 | >50 | >50 |
| *Mycobacterium phlei* | >50 | >50 | >50 | >50 | >50 |
| *Mycobacterium* BCG | >50 | >50 | >50 | >50 | >50 |
| *Escheri coli* | >50 | >50 | >50 | >50 | >50 |
| *Pseudomonas aeruginosa* | >50 | >50 | >50 | >50 | >50 |
| *Serratia marscens* | >50 | >50 | >50 | >50 | >50 |
| *Proteus vulgaris* | >50 | >50 | >50 | >50 | >50 |
| *Xanthomonas oryzae* | >50 | >50 | >50 | >50 | >50 |

NOTE.— — =Not tested.

(2) Action and efficacy on practical use

Polyoxins D, E, F, G and H have superior actions to prevent the mycerial growth and the spread of disease spot, and also have superior persistence, based on results of pot tests and field trials.

The above characteristic actions and persistence of polyoxins D, E, F, G and H will be hereunder described.

(1) Action

The mycerial growth preventive actions of polyoxins D, E, F, G and H are powerful and also the sporulation preventive actions are strong, but spore germination preventive actions are comparatively weak. However, although the spore which has come into contact with polyoxins D, E, F, G and H does once germinate, the germ-tubes do not elongate, but swell into a global form to a size of 2 to 3 times the diameter of the original spore.

This phenomenon occurred completely at 1 p.p.m. of polyoxins D, E, F, G and H and even with 0.1 p.p.m. the phenomenon was considerably marked, and with a minimum of 0.065 p.p.m. it was still noticed. This abnormal or deformed spore loses all properties as a pathogen.

And with the mycelium, the similar phenomenon of swelling into global form was observed.

(2) Usage

For commercial use as an agricultural chemical, polyoxins D, E, F, G and H can be prepared as a dust preparation, an emulsifiable concentrate or a wettable powder, each containing the active polyoxins D, E, F, G and/or H, according to conventional procedure. For example, said polyoxins can be admixed with solid or liquid carriers, such as talc, clay, silica, water, methanol, ethanol, actone, dimethylformaldehyde, and ethyleneglycol.

In addition, said polyoxins can be mixed with adjuvants generally used for agricultural chemicals. The adjuvants may be mixed with said polyoxins in wide range of forms, such as in the form of emulsifier, dispersant and spreader. For example, such adjuvants are non-ionic, anionic and cationic surface active agents, such as polyoxyethylene, alkyl, allylether, alkyl allyl polyethyleneglycolether, alkyl allyl sorbitan monolaurate, alkyl allyl sulfonate, alcoholic ester of sulfate and alkyl dimethyl benzyl ammonium-halide, and formalin condensates of ligninsulfonate and dinaphthylmethane disulfonate, and stearates, polyvinylalcohol, carboxymethyl cellulose and gum arabic.

The preparation of said polyoxin dust, emulsifiable concentrate and wettable powder will be described in Examples 7 to 10.

The polyoxin dust preparation, emulsifiable concentrate and wettable powder are each applied to plants in a form as it is, or in a liquid form diluted with water under agitation according to the desired concentration.

(a) Application to disease on rice-plant:

(i) When polyoxin dust is used against sheath blight on rice-plant (*pellicularia sasakii* in a concentration of 0.2%, the polyoxin dust was scattered at the roots and sheaths of rice-plants at a rate of 2 to 5 kg./10 acre.

(ii) When polyoxin emulsifiable concentrate is used against sheath blight on rice-plants in a concentration of 3.0%, the polyoxin emulsifiable concentrate was sprayed on sheaths of rice-plants at a rate of 17 cc. for 10 l. water.

(b) Application to disease of fruit orchard:

(i) When polyoxin wettable powder is used against black spot of pear (*Alternaria kikuchiana*) in a concentration of 10%, the polyoxin wettable powder was diluted with water under agitation at a rate of 10 g. per 10 l. water and sprayed on leaves of pears.

(ii) When polyoxin wettable powder is used against Alternaria leaf spot of apple (*Alternaria mali*) in a concentration of 10%, the polyoxin wettable powder was diluted with water under agitation at a rate of 10 g. per 10 l. water and sprayed on leaves of apples.

(3) Efficacy

In pot tests to prevent infestations of sheath blight on rice-plants (*Pellicularia sasakii*), polyoxins D, E, F, G and/or H at concentration of 25 p.p.m. and more showed superior efficacy. Also, in pot tests to prevent the spread of disease spots, superior efficacy was observed.

Method: The fixed amount of chemical solution was sprayed on rice plants (Jikkoku species) in pots (grass height: 45 cm.) according to the usual spray method, and test fungus was inoculated one day after spray. The inoculation was carried out by putting the fungus colony (stamp out in dia. 8 mm.) among leaf sheath of rice plants. After treatment, leaf sheath was covered by vinyl and pots were kept inside the green house. After 7 days, the length of infested spot of test fungus was checked.

Test results:

| Chemicals | Concentration (p.p.m.) | Length of infested spot (total of 3 pots) (cm.) | Protective value | Phytotoxicity |
|---|---|---|---|---|
| Polyoxin D | 50 | 19 | 94.7 | — |
|  | 30 | 35 | 90.4 | — |
| Polyoxin D plus E plus F | 50 | 22 | 93.9 | — |
|  | 30 | 41 | 88.7 | — |
| Polyoxin F | 500 | 63 | 82.6 | — |
|  | 250 | 91 | 74.9 | — |
| Polyoxin H | 500 | 90 | 75.1 | — |
| Organoarsenate (wettable powder) | 40 | 51 | 85.9 | — |
| Control | — | 362 | 0 |  |

Furthermore, in pot tests to prevent infestation of rice blast (*Piricularia oryzae*) and to prevent the spread of the disease spots, polyoxins D, E, F, G and/or H showed similar high efficacy to that in above tests.

The persistence of polyoxins D, E, F, G and/or H on rice-plants has been investigated at varying concentrations based on biological activity. Polyoxins D, E, F, G and/or H at concentration of 100 p.p.m. were shown to persist for at least 12 days and 50 p.p.m. for at least 9 days.

Based on these data, field trials to control the sheath blight on rice-plants were carried out. For example, two applications of polyoxin dust containing polyoxin D at 50 p.p.m. had higher control efficacy than two applications of another fungicide, organoarsenates, at 32.5 p.p.m.

Moreover, it was noted that the more the number of applications or the higher the concentration, there was a tendency of increased yields.

Further, application could be made at any stage of growth of rice-plants without producing phytotoxicity.

One of the results of field trials of polyoxin dust containing polyoxins D, E, F, G and/or H against sheath blight on rice-plants is shown in Example 11.

Besides the sheath blight on rice-plants, polyoxins D, E, F, G and H showed high control efficacy against diseases caused by Alternaria species on top fruit orchards, such as black spot on pear (*Alternaria kikuchiana*) and Alternaria leaf spot on apple (*Alternaria mali*).

One of the results of fields trials of polyoxins D, E, F, G and/or H against black spot disease on pears and Alternaria leaf spot disease on apples showed that several applications of polyoxin wettable powder containing polyoxins D, E, F, G or H at 50 to 100 p.p.m. had effectively controlled these diseases as shown in Examples 12 and 13.

As described in the above tests, it is noted that polyoxins D, E, F, G and H are fully useful for immediate commercial use as agricultural fungicides.

Besides the above-mentioned diseases, polyoxins D, E, F, G and H have great promise to be used commercially as agricultural fungicides having high control efficacy against diseases caused by phytopathogenes, such as leaf mold of tomato (*Cladosporium fulvam*) and brown spot of rice-plants (*Cochliobolus miyabeanus*).

Summing up, it is noted that polyoxins D, E, F, G and H are novel antibiotics having superior preventive and curative actions and efficacy aaginst various diseases caused by phytopathogenes without producing phytotoxicity and toxicity, as shown in results of their tests using each of various phytopathogenes in green houses and in the field, and also there was a tendency of increased yields of crops in connection with applications of said polyoxins.

(3) Phytotoxicity and toxicity (A) PHYTOTOXICITY

In phytotoxicity test on rice-plants and various crops polyoxins D, E, F, G and H were non-phytotoxic when used as foliar sprays of concentration of 200 p.p.m. or more. Namely, no phytotoxic signs were noticed even in sprays of concentration of 800 p.p.m. on rice-plants, and sprays of concentration of 200 p.p.m. on other most crops, such as apple, pear and tomato.

(B) TOXICITY (1) In toxicity test with mice each of polyoxins D, E, F, G and H was non-toxic in intravenous injection of 500 mg./kg. or oral administration of 15 g./kg.

(2) In toxicity test with rabbits solution of 400 mg./ml. produced no irritation when instilled into the conjunctival sac of rabbits.

(3) No dermal toxicity was detected.

(4) In toxicity test with fish each of polyoxins D, E, F, G and H at the concentration of 10 p.p.m. was non-toxic during 75 hours period of exposure.

SUMMARY OF THE INVENTION

Polyoxins D, E, F, G and H are each an antibiotic which is prepared by cultivating novel strains of *Streptomyces cacaoi* var. *asoensis* (ATCC access numbers 19093 (type I) and 19094 (type II)) in a culture medium and then separating polyoxin complex containing said polyoxins D, E, F, G and H produced from the culture medium into each of polyoxins D, E, F, G and H.

Based on the physico-chemical and biological properties, especially the chemical structure and the efficacy of said antibiotic, it is noted that said antibiotic, as compared with the known antibiotics, is a novel one.

Carrying out pot tests and field trials, superior results were obtained for the efficacy of said antibiotic to be extremely useful for an agricultural fungicide for the protection of plants on the practical use without producing phytotoxicity and toxicity.

Further, besides said antibiotic can be practically used as an agricultural fungicide for protection of plants within the range of various tests, it is of great promise to be practically used as an agricultural fungicide having high efficacy against other various phytopathogens.

Moreover, it is noted that the applications of said antibiotic show a tendency to increase yields of crops.

BRIEF DESCRIPTION OF THE DRAWING

FIGS. 1–5 indicate ultraviolet absorption spectra for polyoxins D, E, F, G and H, respectively: and FIGS. 6–10 show infrared absorption spectra for polyoxins D, E, F, G and H, respectively.

Figure 1:
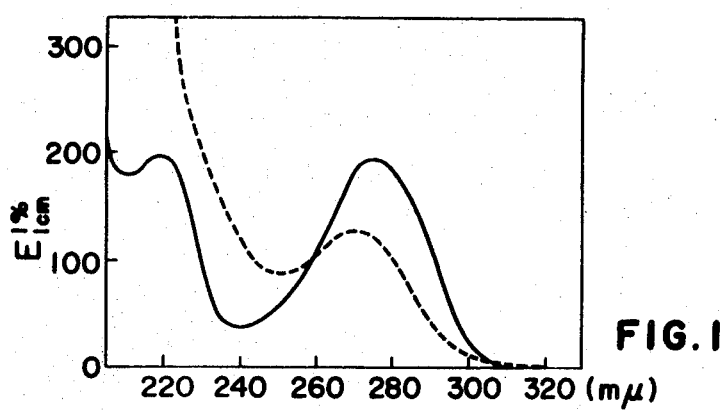
Figure 2:
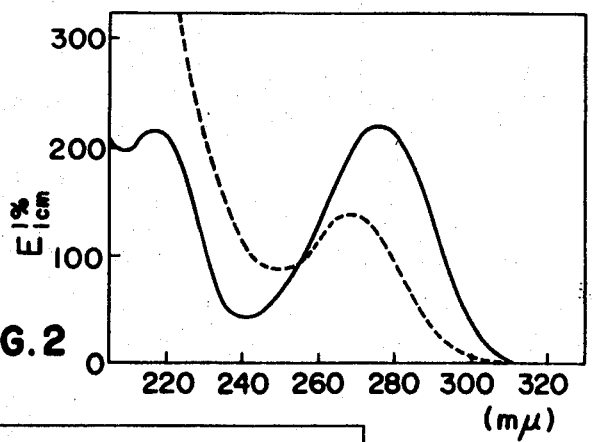
Figure 3:
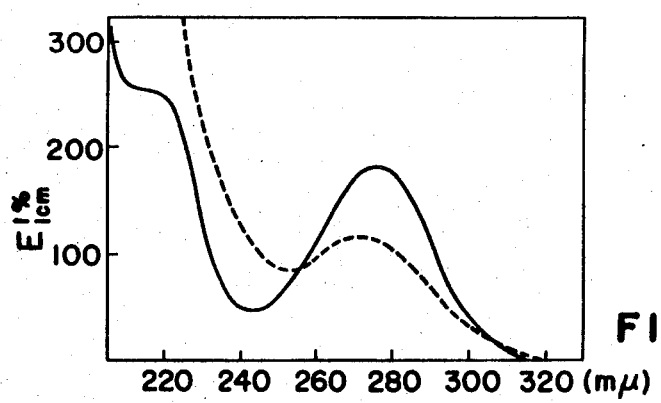
Figure 7:
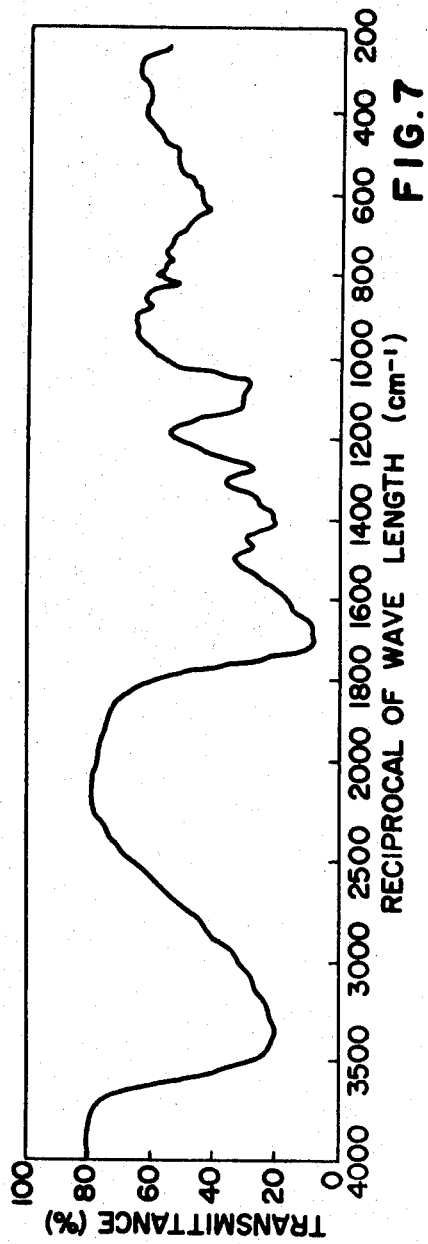
Figure 8:
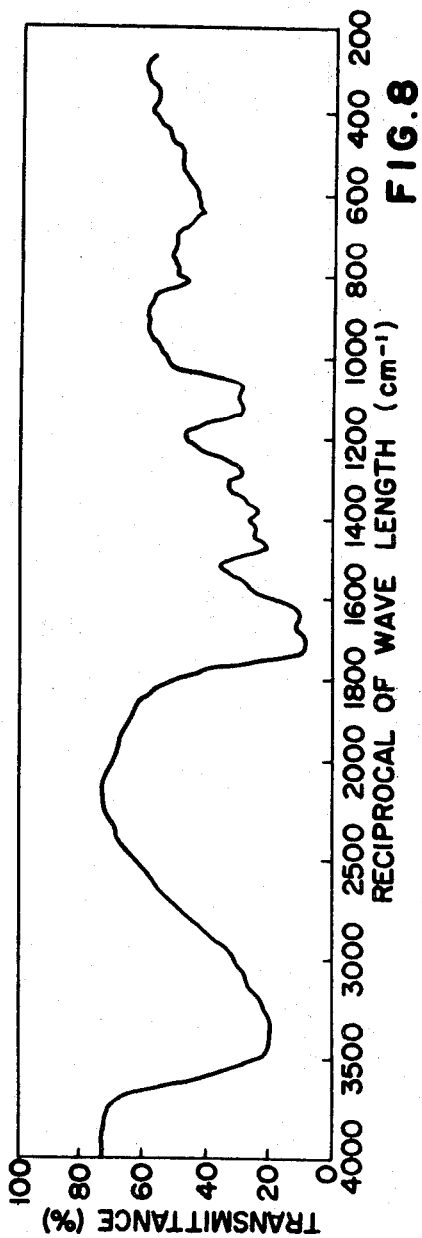

Examples of the process for producing polyoxins D, E, F, G and H are hereinafter described.

EXAMPLE 1

Composition of a culture medium:

|  | Kg. |
|---|---|
| Soluble starch | 12 |
| Wheat embryo | 8 |
| Dry yeast | 4 |
| Soybean meal | 2 |
| Glucose | 2 |
| Calcium carbonate | 0.4 |

Water, 400 liters.

The strain of *Streptomyces cacaoi* var. *asoensis* (type I, ATCC 19093) was cultivated in a seed medium for 48 hours and then the thus-produced seed inoculum was used to inoculate a medium of the above-mentioned composition which had been sterilized at a temperature of 120° C. for 20 minutes. The culture was grown at a temperature of 27° C. under aeration and agitation as far as the maximum potency was obtained, the potency being ascertained by the biological assays carried out during the cultivation. When the cultivation was conducted under aeration rate of 400 liters/min. of sterilized air and under agitation at a rate of 280 r.p.m. for about 96 hours after inoculation with *Streptomyces cacaoi* var. *asoensis* Type I (ATCC 19093), the maximum potency, which was expressed in 1800 mcg./ml. on the basis of polyoxin D, when assayed for potency using *Pellicularia sasakii* as a test organism, was obtained.

EXAMPLE 2

Cultivation was conducted under the same sterilization and cultivation conditions as in Example 1, using a medium consisting of the following ingredients:

|  | Kg. |
|---|---|
| Soluble starch | 10 |
| Wheat embryo | 4 |
| Yeast | 6 |
| Soybean meal | 4 |
| Calcium carbonate | 0.8 |

Water, 400 liters.

The assay for potency showed 1600 mcg./ml. on the basis of polyoxin D from 72 to 96 hours after inoculation with *Streptomyces cacaoi* var. *asoensis* Type I (ATCC 19093), when made using *Pellicularia sasakii* as a test organism.

EXAMPLE 3

Cultivation was effected under the same sterilizing and culture conditions as in Example 1, using a medium consisting of the following ingredients:

|  | Kg. |
|---|---|
| Glucose | 6 |
| Glycerine | 4 |
| Soybean meal | 6 |
| Ammonium sulfate | 2 |
| Yeast | 2 |
| Sodium chloride | 2 |
| Calcium carbonate | 1.6 |

Water, 400 liters.

The test for potency showed a potency of 800 mcg./ml. on the basis of polyoxin D from 72 to 96 hours after inoculation with *Streptomyces cacaoi* var. *asoensis* Type I (ATCC 19093, when made using *Pellicularia sasakii* as a test organism.

EXAMPLE 4

Under the same sterilizing and growing conditions as in Example 1 except for the inoculation of *Streptomyces cacaoi* var. *asoensis* Type II (ATCC 19094) instead of type I, cultivation was continued as far as the maximum potency was obtained, the potency being determined by the biological assay using *Alternaria kikuchiana* and *Cochliobolus miyabeanus* as test organisms, in a medium which was adjusted to a pH value of 7.6 and consisted of the following ingredients:

|  | Kg. |
|---|---|
| Glucose | 6 |
| Glycerine | 4 |
| Soybean meal | 6 |
| Ammonium sulfate | 2 |
| Dry yeast | 2 |
| Sodium chloride | 2 |
| Calcium carbonate | 1.6 |

Water, 400 liters.

The maximum potency was usually reached after 72–96 hours fermentation after inoculation of the medium with *Streptomyces cacaoi* var. *asoensis* Type II (ATCC 19094), when 70 ml. of the medium in 300 ml. Erlenmeyer flask inoculated and shake-cultured. The amount of the antibiotics produced was highest 72 hours after the start of cultivation when a tank containing 400 liters of the medium was inoculated with the inoculum obtained by the 48 hour cultivation in the same way as in the Erlenmeyer flask and shake-cultured at aeration rate of 400 liters/min. of sterilized air and under agitation at a rate of 220 r.p.m.

The potency was 2,000 mcg./ml. on the basis of polyoxin D when determined using *Pellicularia sasakii* as a test organism.

EXAMPLE 5

The culture broth (400 liters) obtained by inoculating the culture medium described in Example 1 with *Streptomyces cacaoi* var. *asoensis* (Type I, ATCC 19093) following the general procedure of Example 1, is incorporated with a 10% aqueous solution of hydrochloric acid to adjust it to pH 5, heated to 70° C., incorporated with 8 kg. of diatomaceous earth and then filtered off with a filter press.

The filtrate is passed through a column packed with 40 liter of cation exchange resin XE–100 (H-type) of 50–100 meshes in size to separate the antibiotics from the filtrate by adsorbing them on the resin. The resin column is washed with water and then the antibiotics adsorbed thereon are eluted with a 0.3 N ammonia water. Of all the eluate fractions thus obtained, the active fractions (which is one that contains the most part of the desired antibiotics present) were concentrated to one-fourth the volume of the original effective eluate fraction and then spray-dried to yield about 900 grams of crude brown powder. This powder (150 grams) is dissolved in a 0.1 M hydrochloric acid-phosphate buffer solution at pH 2. The resulting powder solution is introduced to a column packed with 2 liters of Dowex–50 WX8 (100–200 meshes) previously bufferized with the same buffer solution as above to adsorb the antibiotics on the Dowex resin from the solution, and then developed and eluted with a 0.1 M phosphate buffer solution of pH 5.3. The effective eluate fraction as previously defined gives 30 grams of pale yellow powder after subjecting the fraction to adsorbing and desorbing treatment with active carbon, that is, desalting treatment. The powder is further purified by chromatography using Sulfoethylsephadex. This purified powder is dissolved in a 0.1 M hydrochloric acid-phosphate buffer solution of pH 2. And the resulting powder solution is chromatographed on a column of 50 grams of Sephadex (SE–C–25) previously bufferized with the same buffer solution as above and then developed with the same buffer solution as above to give 15 grams of polyoxin complex. The complex thus obtained is dissolved in water and the resulting solution is introduced to a column of 500 liters of the resin, Amberlite IR–4B Cl type (100–200 meshes). The portion of the solution passing through the column and the water washings used for washing the column are combined and concentrated under reduced pressure to yield 6 grams of white powder which is a mixture of polyoxins A, B, G and H. The resin column is further subjected to elution with a 6% aqueous solution of sodium chloride. The effective eluate fraction so obtained is treated with active carbon to adsorb the antibiotics thereon. After washing the antibiotics-adsorbing carbon, the antibiotics are eluted with a solvent system of methanol-pyridine-water (5:1:4 by volume) and the eluates are concentrated to dryness, yielding 4 grams of white powder. The powder, which contains polyoxins D, F and F, is tightly bound to metal ions (mostly calcium ions), and it is therefore subjected to the following treatments to remove the ions therefrom. The powder is dissolved in a 0.2 N hydrochloric acid, and the resulting solution is passed to a column of 400 liters of Dowex–50–WX–16H type to separate the metals from the solution by retaining them on the resin and passing the solution freed of the metals through the column. The solution thus passed through and the water washings used to wash the column are combined and treated with active carbon to adsorb the antibiotics on the carbon. The carbon is washed with water and the antibiotics are eluted with a solvent system of methanol-acetic acid-water (5:1:4 by volume). The resulting solution is concentrated to dryness to yield 3.4 grams of white powder which contains no ash.

As previously mentioned, a fraction containing polyoxins A, B, G and H is subjected to cellulose column chromatography in order to isolate the polyoxins from each other. More particularly, when 5 grams of such white powder as above were chromatographed using a cellulose column (dia. 55 mm. x length 1000 mm.) and a solvent system of butanol-acetic acid-water (4:1:2 by volume), polyoxin H was eluted first, followed by A, G and B being eluted in said order; the yields were 0.1 g., 1.3 g., 0.15 g. and 1.1 g. for H, A, G and B, respectively.

Isolation of D, E and F from their mixture can be accomplished by the use of cellulose column chromatography of the mixture in quite the same manner as above. For example, when 4 grams of the mixture containing D, E and F were chromatographed, these polyoxins were eluted in the order of F, E and D; and in this case 0.98 g. of D, 0.12 g. of E and 1.04 g. of F were obtained.

Recrystallization of these E, F and G from an aqueous alcohol yielded them as colorless powder, respectively. And the D and H were respectively obtained as colorless crystalline powder when recrystallized from an aqueous alcohol.

EXAMPLE 6

The culture broth (430 liters) obtained by inoculating the culture medium described in Example 4 with *Streptomyces cacaoi* var. *asoensis* (Type II, ATCC 19094) following the general procedure of Example 4, is acidified with a 10% aqueous solution of hydrochloric acid to pH 2.0, heated to 70° C., incorporated with 9 kg. of diatomaceous earth and then filtered off with a filter press.

To the filtrate are added 8 kg. of active carbon and 8 kg. of diatomaceous earth, the resulting mixture is filtered after stirring it and the carbon thus obtained is washed with 350 liters of water. The carbon is extracted twice with 100 liters of 60% acetone, the extract is concentrated under reduced pressure to obtain 4 liters of the concentrated extract to which are then added 50 liters of acetone to obtain precipitates, and then the precipitates are dried under reduced pressure to yield 644 grams of crude brown powder.

A portion of the crude powder (370 grams) is dissolved in water and acidified to pH 2.0, the resulting solution is introduced into a column of 4.5 liters of Dowex 50–WX8 (50–100 meshes) H type to adsorb the antibiotics on the Dowex resin. The antibiotics adsorbed on the resin are eluted with a 5% aqueous solution of sodium chloride after having washed the resin column with water. The effective eluate fraction is subjected to desalting treatment, which comprises adsorption on active carbon and elution from it, and then 60 grams of pale brown powder are obtained from the desalted solution.

The powder is further purified by chromatography using Dowex–50W. More specifically, the powder is dissolved in a 0.1 M hydrochloric acid and phosphate buffer solution of pH 2.0, the resulting powder solution is introduced to a resin column of 2 liters of Dowex 50–WX8 (100–200 meshes) to effect adsorption on the resin and then the substances adsorbed is developed and eluted with a 0.1 M phosphate buffer solution of pH 4.3. The effective eluate fraction obtained gives 29 grams of pale yellow powder after the desalting treatment of the effective fraction.

This pale yellow powder is further purified by chromatography using Sulfoethylsephadex. More specifically, the powder is subjected to chromatography using a column of 50 g. of Sephadex (SE–C–25) previously bufferized with a 0.01 M phosphate buffer solution of pH 2.0, and then developed while the buffer solution is successively increased to 0.1 M in concentration, to finally obtain 14 g. of purified white powder which is polyoxin complex.

The polyoxin complex thus obtained is dissolved in water and the resulting solution is introduced to a resin column of 500 liters of Amberlite IR–4 B Cl type (100–200 meshes).

Both the portion of the solution having passed through the column and the water washing are combined and concentrated under reduced pressure to give 10 grams of white powder. (In this case polyoxins D, E and F are adsorbed on the resin.) The white powder, which contains polyoxins A, B, G and H, is chromatographed using a cellulose column to separate G and H in the pure form from the mixture. More particularly, the powder is subjected to partition chromatography using a cellulose column of 55 mm. in diameter and 1000 mm. in length and using a solvent system of butanol-acetic acid-water (4:1:2 by volume). In this chromatography H is at first eluted, followed by A, G and B being eluted in said order. For example, 0.25 gram of G and 0.2 gram of H are obtained from 5 grams of the polyoxin complex by such chromatography as above.

The G and H may be further purified by means of zone electrophoresis. More particularly, the electrophoresis is conducted, using synthetic resin, zeon as a carrier and a 0.1 M phosphate buffer solution of pH 4.3, at 150 volts for 16 hours to obtain an active or effective fraction of the polyoxins. Extraction of the active fraction with water and subsequent desalting of the extract with active carbon produce each of G and H as purified powder, in yield of about 50%.

Recrystallization of each of tthe thus-obtained G and H from an aqueous alcohol yields G as colorless powder and H as colorless crystalline powder.

EXAMPLE 7

Dust preparation 0.2 part polyoxin D (or F or G or complex), 0.5 parts calcium stearate, 50 parts talc and 49.3 parts clay were mixed and crushed.

The dust preparation is a white powder.

The dust preparation obtained was scattered on plants at a rate of 2 to 5 kg./10 are.

EXAMPLE 8

Emulsifiable concentrate

Five parts polyoxin G (or E or complex), 3 parts polyoxin B, 10 parts ethyleneglycol, 20 parts dimethylformamide, 10 parts alkyl dimethyl benzyl ammonium chloride and 52 parts methanol were mixed and dissolved.

The preparation is pale yellow in color.

The emulsifiable concentrate obtained was diluted with water under agitation within the range of 10 to 200 p.p.m., and sprayed on plants.

EXAMPLE 9

Wettable powder

Five parts polyoxin H (or D or E or F or complex), 10 parts ethyleneglycol, 30 parts methanol, 5 parts polyoxyethylene alkyl allyl-ether and 50 parts water were mixed and dissolved.

The preparation is a white powder and easily soluble in water.

The wettable powder obtained was diluted with water under agitation within the range of 10 to 200 p.p.m., and sprayed on plants.

EXAMPLE 10

Wettable powder

Ten parts polyoxin H (or D or E or F or G or complex), 5 parts sulfuric sodium laurate, 2 parts formalin condensate of dinaphthylmethane disulfonate and 83 parts clay were mixed and crushed.

The preparation is a white powder and easily soluble in water.

The wettable powder obtained was diluted with water under agitation within the range of 10 to 200 p.p.m. and sprayed on plants.

EXAMPLE 11

The results of field trials of polyoxin dust containing polyoxins D, E, F, G and H against sheath blight on rice-plants were as follows:

| Treatment | Infected stem, percent | Degree of damage | Yield (g.)[1] |
|---|---|---|---|
| Polyoxin dust (D) 0.2% | 12.3 | 5.3 | 2,781 |
| Polyoxin dust (D, E, F complex) 0.2% | 16.5 | 8.4 | 2,613 |
| Organoarsenate 0.4% | 18.7 | 9.3 | 2,487 |
| Control | 56.3 | 40.7 | 2,463 |

[1] Weight of grains per 3.3 m.[2].

EXAMPLE 12

The results of field trials of polyoxin wettable powder containing polyoxins D, E, F, G and H against black spot disease on pear were as follows:

| Treatment | Concentration (p.p.m.) | Percent of infected leaves | Percent of diseased fruits |
|---|---|---|---|
| Polyoxin w.p.[1] (D) | 100 | 8.7 | 0.7 |
|  | 50 | 17.4 | 0 |
| Polyoxin w.p.[1] (D+E+F) | 100 | 16.2 | 1.0 |
| Difoltan[2] | 800 | 18.6 | 1.2 |
| Control | | 70.0 | 10.7 |

[1] "w.p." means "wettable powder."
[2] Marketing product.

NOTE.—Application: 8 times each 10 days from May 4 through July 13.

EXAMPLE 13

The results of field trials of polyoxin wettable powder containing polyoxins D, E, F, G and H against Alternaria leaf spot on apple were as follows:

| Treatment | Concentration (p.p.m.) | Percent of infected leaves | Number of disease spot per leaf |
|---|---|---|---|
| Polyoxin w.p. (D) | 100 | 12.3 | 0.38 |
| Polyoxin w.p. (G) | 100 | 17.5 | 0.59 |
| Polyoxin w.p. (D+E) | 50+50 | 14.3 | 0.58 |
| Polyoxin w.p. (D+H) | 50+50 | 16.3 | 0.57 |
| Difoltan | 800 | 15.7 | 0.75 |
| Control | | 63.7 | 2.83 |

NOTE.—Application: 8 times each 10 days from May 25 through August 10. Date of observation: August 30.

We claim:

1. The antibiotic polyoxin D having the structure:

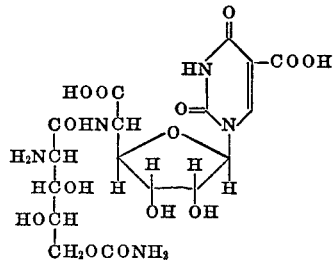

2. The antibiotic polyoxin E having the structure:

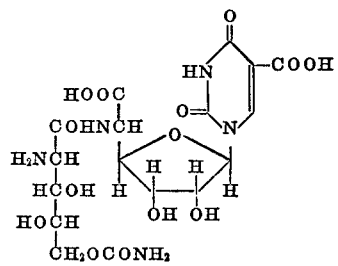

3. The antibiotic polyoxin F having the structure:

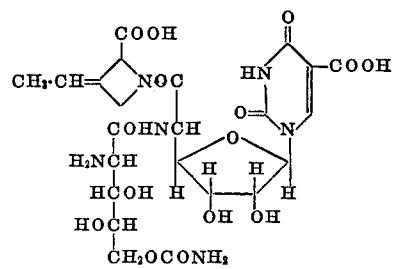

4. The antibiotic polyoxin G having the structure:

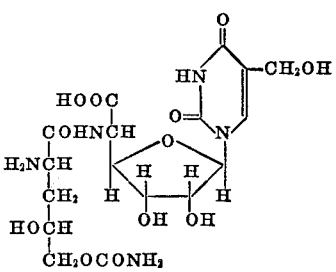

5. The antibiotic polyoxin H having the structure:
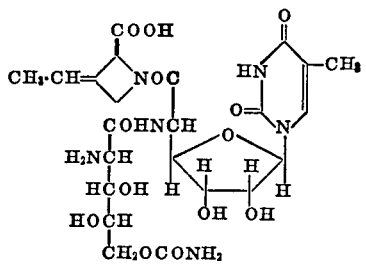
References Cited
Isono et al., Agr. Biol. Chem., vol. 31, No. 2, pages 190–199 (February 1967).
Derwent Farmdoc #20,912, Netherlands Pat. 6512-423, 7 pages, published 3-25-66.
JEROME D. GOLDBERG, Primary Examiner
U.S. Cl. X.R.
195—80